May 9, 1939.    J. P. MEGROOT    2,157,297
INTERNAL COMBUSTION ENGINE
Filed June 9, 1938    2 Sheets-Sheet 1

INVENTOR.
John Peter Megroot
BY Lawler + Lawler
ATTORNEYS.

May 9, 1939.  J. P. MEGROOT  2,157,297
INTERNAL COMBUSTION ENGINE
Filed June 9, 1938  2 Sheets-Sheet 2

INVENTOR.
BY John Peter Megroot
Lawler & Lawler
ATTORNEYS

Patented May 9, 1939

2,157,297

UNITED STATES PATENT OFFICE 2,157,297

INTERNAL COMBUSTION ENGINE

John Peter Megroot, Cleveland, Ohio

Application June 9, 1938, Serial No. 212,739

2 Claims. (Cl. 123—32)

The invention relates to improvements in internal combustion engines and has for its objects to increase their efficiency.

The invention refers to a method (and means) for bringing about an efficient vortex or whirl in a combustible mixture for an oil engine formed by vaporization at comparatively high temperature, or a combustible mixture formed by mechanical pulverization or atomization, and for preventing the heat burning oils or fuels from reaching the cooler parts of the combustion chamber by shaping an insert which is placed in the engine cylinder which is combined with the cylinder head in a particular manner, whereby a number of important advantages are obtained.

An important object of the present invention is to impart a vortex motion to an injected fuel in the hottest zone in the combustion chamber by means of tangential impingement of compressed air thereon, the impinging air having a higher temperature and pressure than that existing in the zone. Because of the tendency of the fuel particles to fly off, or the reaction of the particles against being pulled out of a straight line, the heavier oil particles are caused to cling to the wall of the central zone formed in the combustion chamber in a thin film.

Accordingly this invention obviates difficulties which have been experienced due to chilling of the injected fuel coming into contact with the colder surrounding water cooled engine cylinder.

Other objects of the invention will appear from the following description.

The invention and its aims and objects will be clearly understood from the following description, taken in connection with the accompanying drawings, embodying my invention, the true scope of the invention being more fully pointed out in the appended claims.

Apparatus according to the invention is illustrated by way of example in the accompanying drawings, in which.

Like reference characters refer to like parts in the several views.

The advantages of the method and means are as follows:

1. In the compression stroke, at the finishing stage, the compression of the medium peripherally of the insert is higher than the air in the combustion chamber.

2. The central zone in the combustion chamber is free from the cooling effects of the surrounding cooling water in the water jacket, there being no direct contact with the cylinder wall, there are therefore considerable less heat losses at the compression stroke through conduction.

3. The medium (air) peripherally of the insert is forced through passages or channels at a higher pressure, with the result that its temperature rises, thus imparting additional heat to the fuel charge in the central or hottest zone.

4. The small percentage of leakage air circumferentially of the insert into the combustion chamber prevents what is left of the fuel from coming into contact with the colder parts of the cylinder, supplying at the same time a portion of the unused oxygen which is free from the combustion products.

5. At the power stroke, the central zone, is partly relieved of exhausted gases which leaves the combustion chamber first, being drawn through the air channels or ducts into the annular recess, thus getting away from the area where combustion is still taking place. The separation of a great quantity of the exhaust gases provides an opportunity for better contact between the remaining fuel and air.

6. By the use of this method and means, an injector of self cleaning needle type, having a single and somewhat larger discharge orifice may be used, therefore clogging the injector orifice by means of insoluble residues held in suspension in the fuel is practically overcome.

7. The volumetric ratio between the annular recess, the central zone and the remainder of the combustion chamber may be varied to effect efficiency without changing the principles laid down in the improvements.

8. It involves the further advantages that the insert can be utilized for the accommodation of the valves, and that the insert may be removed and replaced without changing the head of the cylinder. It also provides a construction and arrangement whereby a metal differing in structure and composition from that of the cylinder head proper may be used.

Figure 1:
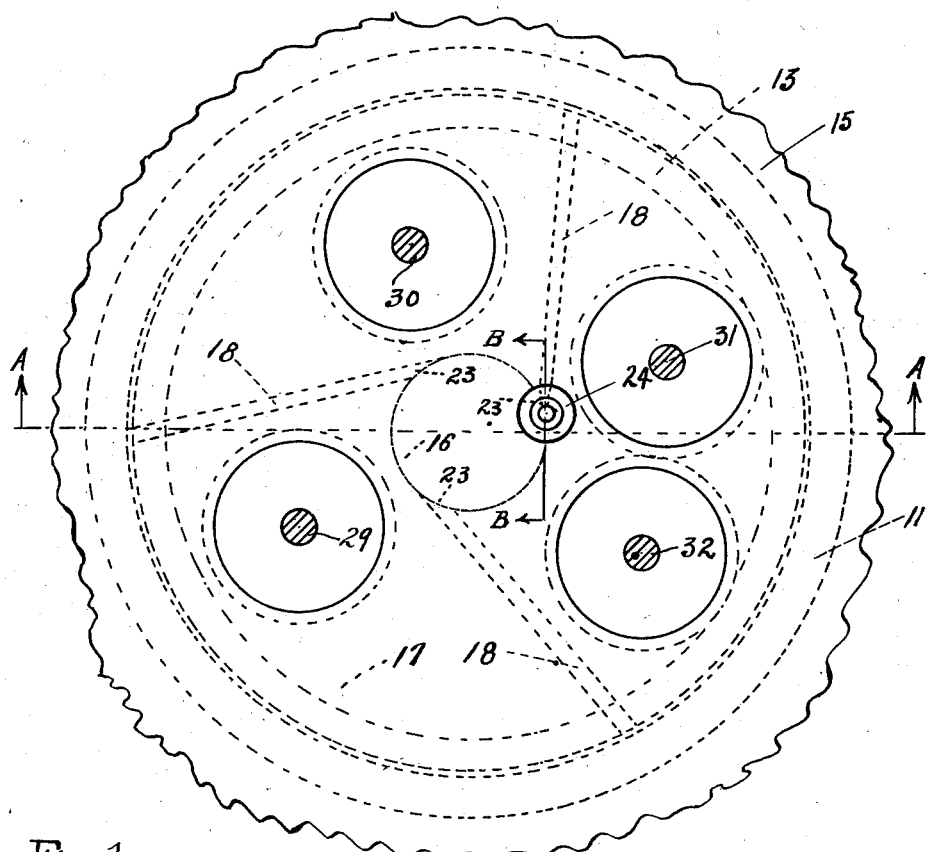
Figure 1 is a fragmentary top plan view of one form of cylinder head and insert.
Figure 2:
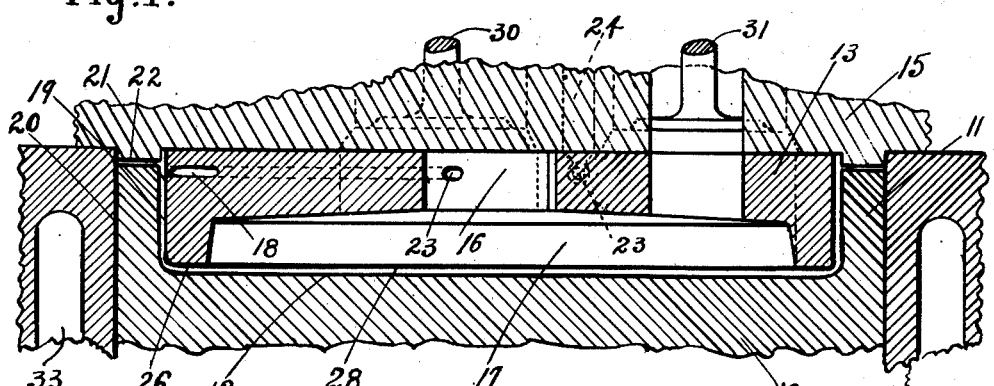
Figure 2 is a vertical cross sectional view of the apparatus taken on line AA of Figure 1.

Referring to Figure 2, the piston 10 is provided with an annular upward extending skirt portion 11, at the upper end 12 of the piston 10. The piston is provided with the usual gudgeon pin, and a connecting rod having a bearing for the crankpin of the crankshaft, (not shown but understood in the art).

The insert 13 is fixed by any suitable means in the cylinder 14, or to the cylinder head 15. The insert is provided with a central zone 16, and therebelow and communicating therewith an enlarged chamber 17. The insert is provided with a plurality of channels or ducts 18, 18 and 18, which are utilized for conveying the compressed medium (air) from the annular space 19 formed by the inner wall 20 of the cylinder, the outer periphery 21 of the insert, and a portion 22 of the cylinder head. The channels or ducts are also utilized to relieve the central zone from gases on the power stroke, while combustion may still be going on. The nozzles 23, 23, 23 of the discharging channels, may be of the converging, diverging or venture type. The channels may be formed likewise if desired.

Figure 3:
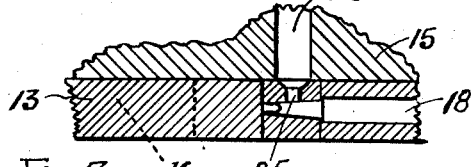
Figure 3 is a fragmentary sectional view taken on line BB of Figure 1.

It will be noted that the channels or ducts are arranged tangentially or nearly so to the perimeter of the central zone, so that the impingement of the compressed medium on the wall therein imparts to the injected fuel a spiral or vortex action. The unit injector valve (not shown but understood in the art) may be mounted in the orifice 24 through which the injector fuel may be admitted into the central zone. The fuel orifice and the medium discharging channel may be provided with differential diameters at their intersections as at 25, shown in Figure 3. Obviously the injector or injectors may be disposed in various positions and angles to and with the channels, and also with the central zone.

It will be noted that the outer periphery 21 of the insert, and its bottom horizontal plane 26 are out of contact with the inner periphery of the piston skirt and the upper end 12 of the piston 10, to leave a passage 28 of effective area to allow leakage of medium therebetween, which leakage passes to and into the enlarged chamber 17, and mixes with the medium and fuel therein.

The insert can also be utilized for the accommodation of the mushroom valves 29, 30, 31 and 32. The water jacket of the cylinder is shown at 33.

Figure 4:
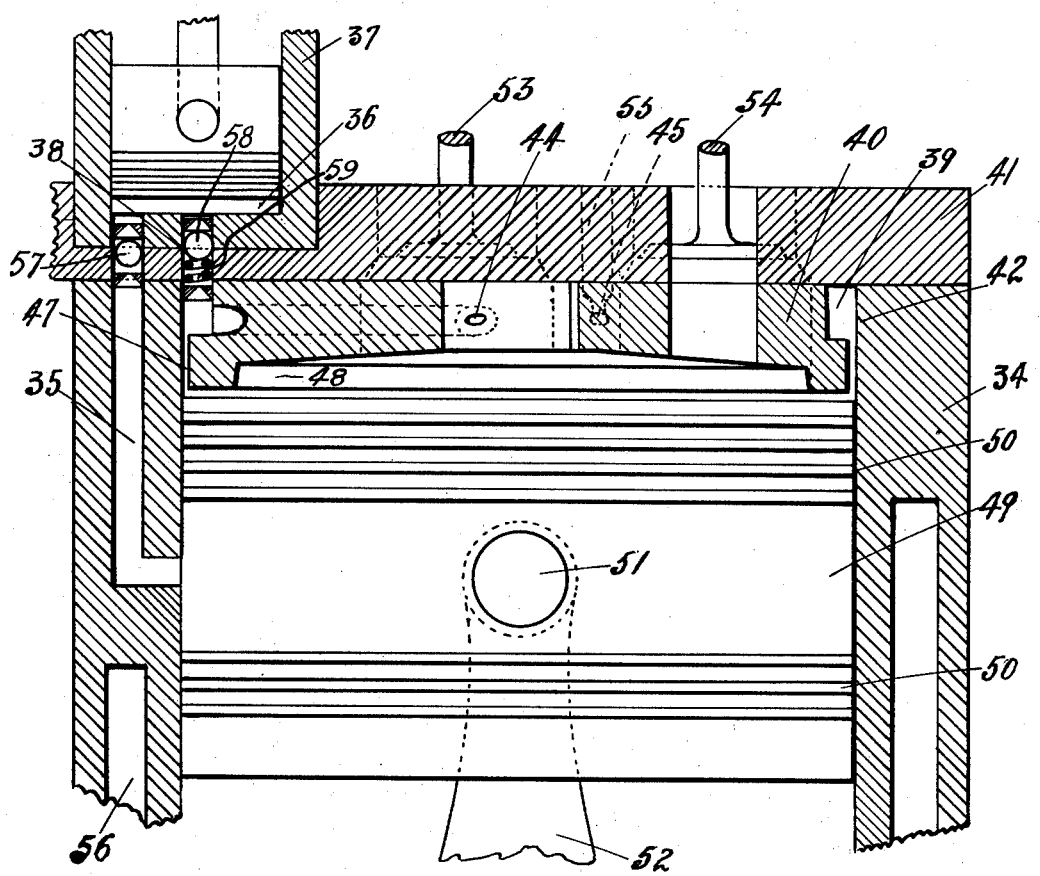
Figure 4 is a different form of insert, cylinder head and piston according to this invention.

In Figure 4, the cylinder 34 is provided with a by-pass 35 leading into the cylinder 36 of the pressure means or compressor 37 which has a conduit 38 leading into the annular space 39, formed by the insert 40, the cylinder head 41 and the cylinder wall 42. The cylinder of the reciprocating air compressor 37 may be rigidly fixed to or with the cylinder head. However a high-pressure turbo compressor may be used if desired. The compressor may be actuated in any practical manner, (not shown but understood in the art).

The compression in the engine cylinder and the compression of the compressor imparts additional pressure to the medium (air) in the annular space thereby forcing the air into the central zone through the channels or conduits 44, 45, in the insert, thereby assuring an efficient vortex in the central zone.

The circumferential leakage space 47 leads the medium into the chamber 48 in the insert where it communicates with the fuel in the central zone.

The compressor and the by-pass are each provided with proper check valves, permitting the medium to flow from the engine cylinder to the compressor cylinder, and from the compressor cylinder into the annular space, but preventing reverse flow of medium. The valves are shown at 57 and 58. The valve 58 is controlled by helical spring 59.

The piston 49 is provided with piston rings 50, a gudgeon pin 51 and a connecting-rod 52. The mushroom valves are shown at 53 and 54, and the injector receiving orifice is shown at 55. The cylinder water jacket is shown at 56.

Since the operation of the various sets of mechanism by which the purpose of the apparatus is achieved have been described in connection with the description of said mechanism, it is believed that a résumé of the operation of the entire engine is unnecessary.

It is to be understood that the invention includes broadly any means for carrying out the co-ordinate functions exemplified in the present internal combustion engine, and that the details of construction as shown and described are merely illustrative and not to be considered limitative in their bearing upon the invention.

What I claim as new and desire to secure by Letters Patent of the United States is:

1. In an internal combustion engine the combination of an engine cylinder; a piston reciprocating therein; a peripheral flange projecting beyond the piston head; a cylinder head formed with intake and exhaust ports and an opening adapted to receive a fuel injection nozzle; a cylindrical insert attached to said cylinder head and provided with an annular flange, a central bore forming an auxiliary chamber, ports and an opening in alignment with said intake and exhaust ports and said fuel-nozzle receiving opening, a plurality of transverse conduits located between said ports and said opening extending from the external periphery of said insert and opening tangentially with respect to the wall of said central bore; said insert projecting into said cylinder and having an external diameter less than the internal diameter of said peripheral flange, whereby at the top dead center position of said piston said peripheral flange enters the space formed between said annular flange and cylinder wall, forcing the contents of said space into said central bore and forming a clearance between said flanges which is in communication with the combustion chamber defined by the inner surface of said annular flange and the piston head.

2. An internal combustion engine including in combination a compression cylinder, a working cylinder, in communication therewith, pistons operating in said cylinders, a cylinder head formed with intake and exhaust ports and an opening adapted to receive a fuel injection nozzle, an insert attached to said cylinder head and projecting into the working cylinder and formed with two circular cross-sections of smaller diameter than the working cylinder and forming with the said cylinder and cylinder head two annular spaces surrounding the insert, a central bore forming an auxiliary chamber, ports and an opening in alignment with said intake and exhaust ports and said fuel-nozzle receiving opening, a plurality of transverse conduits located between said ports and said opening extending from the external periphery of the smaller of the two circular cross-sections of said insert and opening tangentially with respect to the wall of said central bore, a by-pass connecting the working cylinder and the compression cylinder, and a by-pass connecting the compression cylinder and the annular spaces, and check valves in the aforesaid by-passes to control the flow of compressed medium therethrough.

JOHN P. MEGROOT.